US011558335B2

(12) United States Patent
Brooks Powell et al.

(10) Patent No.: US 11,558,335 B2
(45) Date of Patent: Jan. 17, 2023

(54) GENERATIVE NOTIFICATION MANAGEMENT MECHANISM VIA RISK SCORE COMPUTATION

(71) Applicant: INTERNATIONAL BUSINESS MACHINES CORPORATION, Armonk, NY (US)

(72) Inventors: Natalie Brooks Powell, Bolingbrook, IL (US); Shikhar Kwatra, San Jose, CA (US); Jeremy R. Fox, Georgetown, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/029,085

(22) Filed: Sep. 23, 2020

(65) Prior Publication Data

US 2022/0094657 A1 Mar. 24, 2022

(51) Int. Cl.
*H04L 51/224* (2022.01)
*H04L 51/046* (2022.01)
*H04L 51/216* (2022.01)
*G06N 3/08* (2006.01)
*G06N 20/00* (2019.01)

(52) U.S. Cl.
CPC .......... *H04L 51/224* (2022.05); *G06N 3/088* (2013.01); *G06N 20/00* (2019.01); *H04L 51/046* (2013.01); *H04L 51/216* (2022.05)

(58) Field of Classification Search
None
See application file for complete search history.

(56) References Cited

U.S. PATENT DOCUMENTS

| 7,249,162 B2 | 7/2007 | Rounthwaite |
| 7,519,672 B2 | 4/2009 | Boss |
| 9,167,300 B2 | 10/2015 | McRae |
| 9,183,306 B2 | 11/2015 | Robarts |
| 9,197,590 B2 | 11/2015 | Beausoleil |

(Continued)

OTHER PUBLICATIONS

Briland Hitaj, Giuseppe Ateniese, Fernando Perez-Cruz, "Deep Models Under the GAN: Information Leakage from Collaborative Deep Learning", Acm CCS'17 (Year: 2017).*

(Continued)

*Primary Examiner* — Chris Parry
*Assistant Examiner* — Abderrahmen Chouat
(74) *Attorney, Agent, or Firm* — Michael O'Keefe

(57) ABSTRACT

A method, computer system, and computer program product for AI-enabled application notification mute management is provided. The embodiment may include generating a communication corpus from real time data. The embodiment may also include identifying a current activity level for a user. The embodiment may further include receiving a new communication from an application. The embodiment may also include calculating a priority value for the received communication. The embodiment may further include determining whether to mute a notification transmission of the received communication to the user based on the calculated priority value and the generated communication corpus. The embodiment may also include, in response to determining to mute the notification transmission; muting the notification.

17 Claims, 5 Drawing Sheets

(56) References Cited

U.S. PATENT DOCUMENTS

| | | | |
|---|---|---|---|
| 9,451,584 B1* | 9/2016 | Cosenza | H04L 51/00 |
| 10,098,090 B2 | 10/2018 | Koum | |
| 2004/0054744 A1 | 3/2004 | Karamchedu | |
| 2017/0277559 A1* | 9/2017 | Mullins | G06Q 10/0633 |
| 2018/0146089 A1 | 5/2018 | Rauenbuehler | |
| 2018/0349379 A1* | 12/2018 | Bostick | H04L 51/26 |
| 2019/0036856 A1* | 1/2019 | Bergenlid | H04N 21/4788 |
| 2019/0087691 A1* | 3/2019 | Jelveh | G06N 3/084 |
| 2019/0156293 A1* | 5/2019 | Kumar | G06Q 10/06314 |
| 2019/0158447 A1* | 5/2019 | Aggarwal | H04W 8/18 |
| 2019/0354594 A1* | 11/2019 | Foster | G06F 40/35 |
| 2021/0297376 A1* | 9/2021 | Rafferty | G06F 16/285 |
| 2021/0343269 A1* | 11/2021 | Sathsahayaraman | H04L 51/18 |

OTHER PUBLICATIONS

Anonymous, "Multitasking: does it fit into the future of work?", The Economist, Guest Blog, https://execed.economist.com/blog/industry-trends/multitasking-does-it-fit-future-work, accessed Mar. 19, 2020, 9 pages.

Anuar, "Entropy Based Explicit Matrix Factorization for Recommender Systems," Tel Aviv University, Nov. 2015, 135 pages.

Averill-Snell, "Is Multi-tasking Counterproductive?", American Management Association, amanet.org, Jan. 24, 2019, https://www.amanet.org/articles/is-multi-tasking-counterproductive/, 8 pages.

Bailey, "The art of doing one thing at a time", A Life of Productivity, Focus, Apr. 11, 2016, https://alifeofproductivity.com/do-one-thing-at-a-time/, 4 pages.

Favre, "WhatsApp lets you mute groups for 1 century," AndroidPIT.com, Apr. 28, 2014, https://www.androidpit.com/whatsapp-lets-you-mute-groups-for-1-century, 7 pages.

Kwon et al., "MyMessage: Case-based reasoning and multicriteria decision making techniques for intelligent context-aware message filtering." Elsevier, Expert Systems with Applications 27 (2004): 467-480.

Mell et al., "The NIST Definition of Cloud Computing", National Institute of Standards and Technology, Special Publication 800-145, Sep. 2011, 7 pages.

Mendiratta, "How to Mute Individual Chat, Group, Status in WhatsApp", TechUntold.com, https://www.techuntold.com/how-to-mute-individual-chat-in-whatsapp/, accessed Mar. 19, 2020, 10 pages.

Overbeeke et al. "Beauty in Usability: Forget About Ease of Use!" Pleasure with products: Beyond usability (2000), 11 pages.

Pettersson, "Artificial intelligence—The search for productivity", IBM, Jun. 12, 2018, https://www.ibm.com/blogs/nordic-msp/artificial-intelligence-search-productivity/, 7 pages.

Quast, "Want to be More Productive? Stop Multi-Tasking", Forbes.com, Feb. 6, 2017, https://www.forbes.com/sites/lisaquast/2017/02/06/want-to-be-more-productive-stop-multi-tasking/#3444b5eb55a6, 4 pages.

Kim, et al., "Bio-inspired Human-Machine Interfaces and Healthcare Applications", Proceedings of the 1st International Workshop on Bio-inspired Human-Machine Interfaces and Healthcare Applications—B-Interface 2010, in Conjunction with BIOSTEC 2010, INSTICC, Jan. 2010, pp. 59-66.

Schut et al., "Biometrics for Emotion Detection (BED): Exploring the Combination of Speech and ECG," Proceedings of the 1st International Workshop on Bio-inspired Human-Machine Interfaces and Healthcare Applications—B-Interface 2010, INSTICC Press, Jan. 21, 2010, pp. 51-58.

* cited by examiner

GENERATIVE NOTIFICATION MANAGEMENT MECHANISM VIA RISK SCORE COMPUTATION

BACKGROUND

The present invention relates generally to the field of computing, and more particularly to notification systems.

Notifications may relate to messages transmitted and/or displayed to a user that alerts the user to an item. For example, if a messaging application receives a message, a notification may be displayed on a device home screen to alert the user of the received message. The displayed notification may be temporary (e.g., disappears from the device screen after a preconfigured period of time has elapsed) or permanent (e.g., the message only clears when manually removed by the user or the user has viewed the notification). A notification system may include software and hardware that has the capability of delivering a message to a recipient from a sender. Notification systems may be interrelated with other systems to provide additional capabilities to unrelated entities. For example, a calendar program may have notification system capabilities that allow a notification to be sent to a user when a calendar event is upcoming.

SUMMARY

According to one embodiment, a method, computer system, and computer program product for AI-enabled application notification mute management is provided. The embodiment may include generating a communication corpus from real time data. The embodiment may also include identifying a current activity level for a user. The embodiment may further include receiving a new communication from an application. The embodiment may also include calculating a priority value for the received communication. The embodiment may further include determining whether to mute a notification transmission of the received communication to the user based on the calculated priority value and the generated communication corpus. The embodiment may also include, in response to determining to mute the notification transmission; muting the notification.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
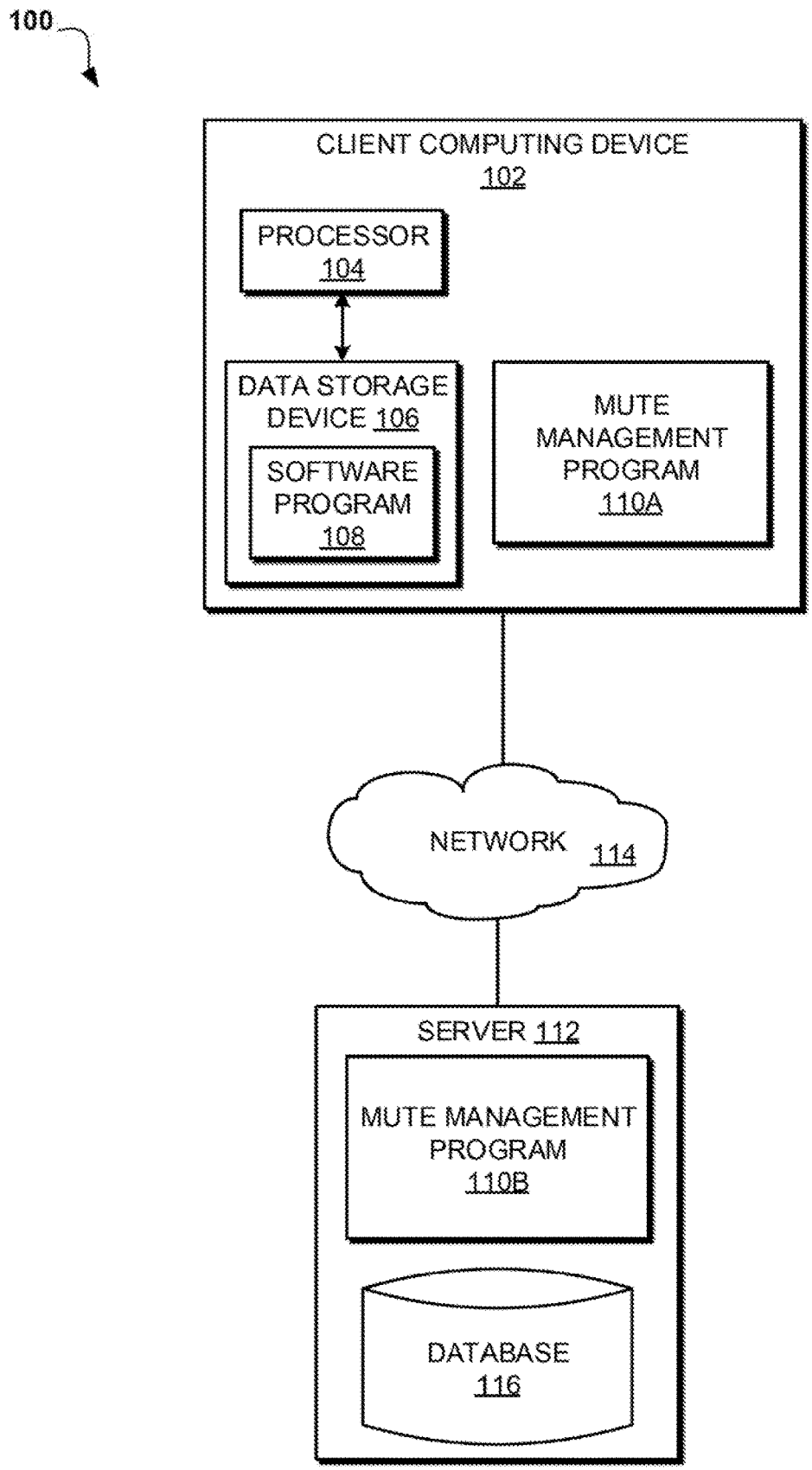
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to notification systems. The following described exemplary embodiments provide a system, method, and program product to, among other things, utilize artificial intelligence (AI) to enable application notification mute management. Therefore, the present embodiment has the capacity to improve the technical field of notification systems by conserving system resources utilized by users to complete tasks ineffectively.

As previously described, notifications may relate to messages transmitted and/or displayed to a user that alerts the user to an item. For example, if a messaging application receives a message, a notification may be displayed on a device home screen to alert the user of the received message. The displayed notification may be temporary (e.g., disappears from the device screen after a preconfigured period of time has elapsed) or permanent (e.g., the message only clears when manually removed by the user or the user has viewed the notification). A notification system may include software and hardware that has the capability of delivering a message to a recipient from a sender. Notification systems may be interrelated with other systems to provide additional capabilities to unrelated entities. For example, a calendar program may have notification system capabilities that allow a notification to be sent to a user when a calendar event is upcoming.

Typically, many companies receive a return on investment from employees through employee productivity. Real time communication systems, such as Slack® (Slack and all Slack-based trademarks and logos are trademarks or registered trademarks of Slack Technologies and/or its affiliates) or WhatsApp® (WhatsApp and all WhatsApp-based trademarks and logos are trademarks or registered trademarks of Facebook, Inc. and/or its affiliates), have become exceedingly popular communication forums in the personal as well as the business space. Using real time communication systems, users can interact individually or through a multi-user group where not only textual conversations can be conducted but media content, such as images, videos, and graphics interchange format (GIF) files, may also be shared.

When any new message or content is received through a real time communication system, a user may immediately receive a notification of the new message or content. Due to surging popularity of real time communication systems installed on both personal and business user devices, many users are receiving notifications, or alerts, of new messages or content that may result in a user becoming distracted from the user's current task. Many real time communication systems offer the user the ability to mute a conversation or the entire application, which prevents the user from receiving alerts or notifications for a period of time. However, mute functionality is time bound. For example, a user is only capable of muting for a preconfigured period of minutes, hours, or days. Additionally, when an application or conversation is muted so as to avoid distractions, the user may not become aware of important communications being received. As such, it may be advantageous to, among other things, implement AI-enabled mute management in a real time communication system to ensure a user is notified of important messages in a timely fashion while preventing the user from becoming distracted by unimportant communications.

According to at least one embodiment, an iterative learning mechanism to identify when a real-time communication message needs to be muted or unmuted in a prioritized fashion is presented. A generative priority risk score pertaining to evaluating a timeline to notify a particular user regarding a notification may be created based on neural weightage assigned to various attributes. Using historical learning about a user's interaction pattern with real-time communication content, level of engagement of the user with other activities, pattern of distraction of the user, and pattern of reply messaging, a knowledge corpus may be created to identify various contextual situations when the communication content should be muted or unmuted using a deep reinforcement module. A comparative priority score of an incoming message may be analyzed with respect to the user's current level of activity and attention required via generative adversarial networks (GANs) and, accordingly, decide if the user is to be notified or the received content is to be muted. Additionally, in the event notifications are muted, a prediction of an available time for the user to interact with the real-time communication content and notifying the user about unread messages may be calculated. Such a notification may be shown based on a calculated priority score for a particular message so that the user can interact with the real-time communication content selectively. Such implementation allows a user to receive the required information present in an important communication in a timely fashion and comparatively unimportant messages can be dynamically muted for later viewing by or notification to the user.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to utilize artificial intelligence to calculate situations where notifications from real-time communication systems should be muted in order to prevent user distractions.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a mute management program 110A and communicate with the server 112 via the communication network 114, in accordance with one embodiment of the invention. Client computing device 102 may be, for example, a wearable smart device, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively.

The server computer 112 may be a laptop computer, netbook computer, personal computer (PC), a desktop computer, or any programmable electronic device or any network of programmable electronic devices capable of hosting and running a mute management program 110B and a database 116 and communicating with the client computing device 102 via the communication network 114, in accordance with embodiments of the invention. Database 116 may be a repository capable of storing emotional state data associated with a user as well as a GAN-Q learning-enabled, personalized communication corpus. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the mute management program 110A, 110B may be a program capable of capturing historical user interaction data with real-time communication content, level of engagement of the user with other activities, pattern of distraction of the user, and reply message patterns to generate a knowledge corpus for identification of various contextual situation when communication content may require muting or unmuting using a deep reinforcement module. Additionally, the mute management program 110A, 110B may be capable of analyzing a comparative priority score of an incoming message with respect to the user's current level of activity and attention required, as generated by GANs, and, accordingly, determining if the user should be notified of the incoming message or notification should be muted to avoid unnecessary user distraction. Furthermore, in at least one embodiment, the mute management program 110A, 110B may be capable of calculating an available time prediction of when the user may be able to interact with the real-time communication so as to incur minimal distraction. The mute management method is explained in further detail below with respect to FIG. 2.

Figure 2:
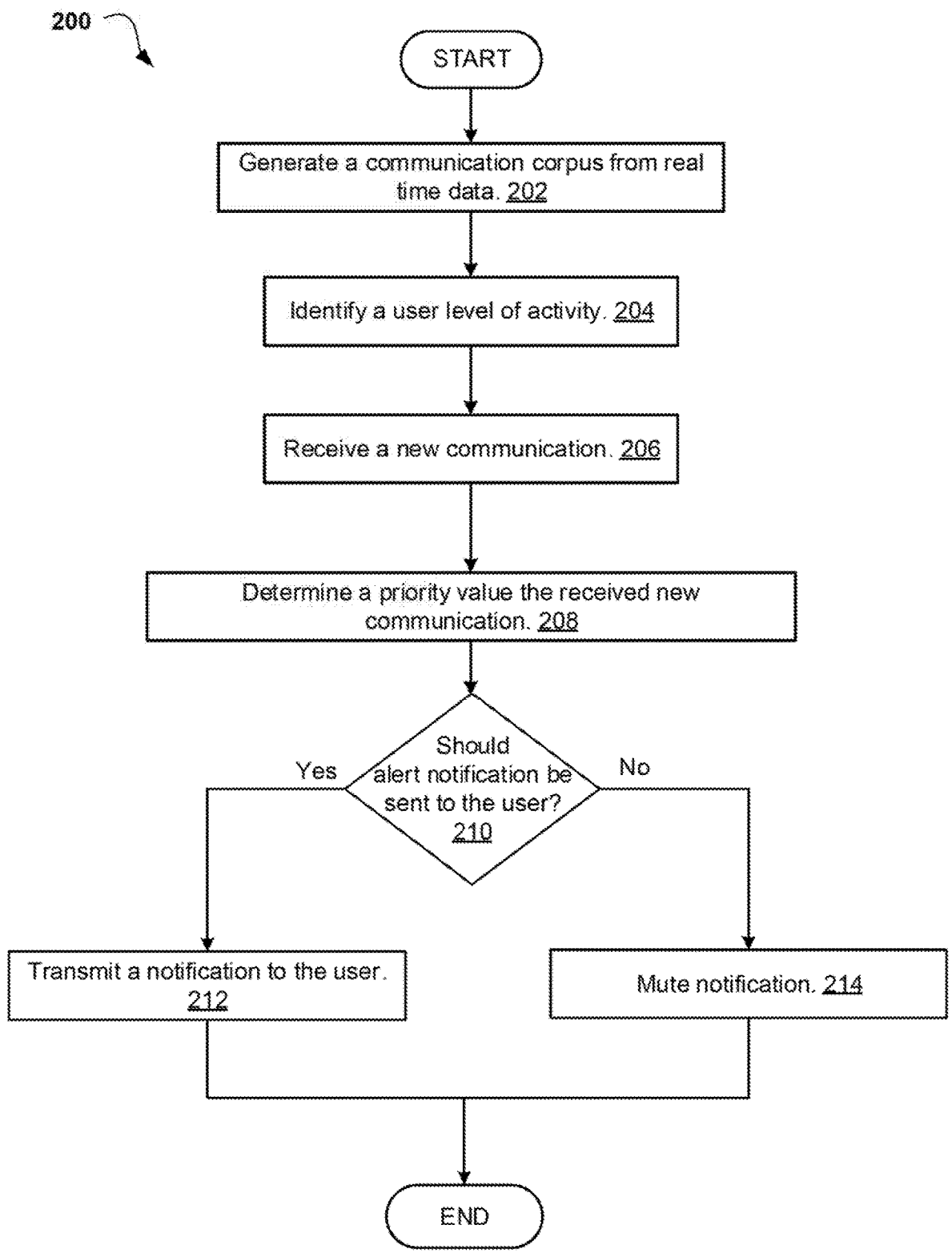
FIG. 2 illustrates an operational flowchart for mute management process according to at least one embodiment.

Referring now to FIG. 2, an operational flowchart illustrating a mute management process 200 is depicted according to at least one embodiment. At 202, the mute management program 110A, 110B generates a GAN-Q learning-enabled, personalized communication corpus from real time data. Upon an initial activation of AI-enabled mute management from a settings menu or upon installation of the mute management program 110A, 110B, the mute management program 110A, 110B may gather various data items in order to generate a GAN-Q learning-enabled, personalized communication corpus that may be subsequently used for notification mute management. During generation of the communication corpus, the mute management program 110A, 110B may gather historical user interaction data to identify patterns using known machine learning techniques, identification of user distraction points while performing tasks, and prioritizing user tasks and activities.

In at least one embodiment, the mute management program 110A, 110B may track various user interactions with historical incoming messages when building the communications corpus, such as a user's selective reading of communication messages, user time spent on individual messages, user reactions to messages, messages skipped or time spent on messages that falls below a threshold, and reactions to a communication by other users within a group communication.

Additionally, the mute management program 110A, 110B may perform iterative task and personal time-based management tracking. To accomplish this, the mute management program 110A, 110B may capture user interactions with any real-time message content (e.g., reading or replying), such as tracking the user's available time, the contextual situation when the user interacts with messages or skips messages, and determining if the notification from the real-time communication system is distracting from a current user activity.

In at least one embodiment, the mute management program 110A, 110B may identify user distraction points. While performing various tasks, a user may become distracted by arriving notifications. When a specific notification is displayed, the mute management program 110A, 110B may determine various attributes related to the subsequent user actions, such as the content of the notification, the user's action upon observing the notification, and, if the user became distracted by the notification, the length of the subsequent distraction of the user's prior task. Additionally, the mute management program 110A, 110B may utilize biometric data to determine how the user gets distracted based on the notification. For example, a pop up notification may cause the user's eye gaze to shift focus from a task. In some situations, a notification may not be the cause of the user distraction, which may be identifiable through biometric data. For example, a notification may be displayed within close temporal proximity to the user being asked a question by another individual. The mute management program 110A, 110B may utilize user biometric data to determine that the question by the other individual resulted in a user response, which the mute management program 110A, 110B may identify as a distraction rather than the received notification.

Furthermore, the mute management program 110A, 110B may develop the communication corpus to include activity and priority management tracking. While the user is performing, or has performed, an activity after having received a communication, the mute management program 110A, 110B may analyze the type of activity and calculate a priority for a communication based the individual(s) associated with the activity and the subsequent user actions to the activity. Additionally, the priority of the individual(s) associated with the activity may be based on a receiving party-specific priority score or a sending party-specific priority score. The subsequent user actions may include a user response to a communication of which the notification was triggered. The mute management program 110A, 110B may analyze the context of user responses to determine message priority. For example, user communication responses to a message that state "You should have called me instead of messaging" or "Sorry for the delay" may indicate that the message should be high priority.

Within the prioritization process, the mute management program 110A, 110B may determine a personal relationship between the user and the participant(s) of the communication as well as associating read messages and unread messages with the determined relationship. For example, the mute management program 110A, 110B may determine that a close relationship between the user and Participant A exists based on word usage in communications, such as "I love you", and that the user always stops the current activity to read communications from Participant A. The mute management program 110A, 110B may make a dissimilar determination should the user not read messages from Participant B until after the user has completed the current activity. While the mute management program 110A, 110B may utilize the above techniques for determining prioritization rules for the communication corpus during generation of the corpus, the mute management program 110A, 110B may also utilize the above mentioned techniques when calculating the priority value for each incoming communication as described further in step 208.

The mute management program 110A, 110B may also determine when a user is interacting with real-time communication content with respect to available time, calendar availability, and the user's current cognitive state based on gathered biometric data from connected user devices. The mute management program 110A, 110B may derive the user's current cognitive states using connected biometric sensors, movement sensors, and video stream based on user opt-in preferences. The mute management program 110A, 110B may utilize user device biometric sensors, such as smart watch biometric sensors, to capture biometric information, such as pulse rate, skin temperature, blood pressure, etc., to determine a user emotional state. In at least one embodiment, user device movement sensors, such as accelerometers and gyroscopes, may be utilized to capture user movements which, in turn, may be used to determine a user mood or emotional state. For example, an excited person may make many small rapid movements whereas a sad person may keep completely still. In at least one other embodiment, the mute management program 110A, 110B may make the determination and the derivation during the calculation of the priority value discussed further in step 208.

Once all necessary historical data has been gathered, the mute management program 110A, 110B may utilize a pseudo algorithm when generating the communication corpus. The mute management program 110A, 110B may perform machine learning techniques on the historical data to identify various contextual situations when the communication content needs to be muted so as to not distract the user and when communication should be appropriately unmuted. The generator network $G:Z \rightarrow X$ may be a mapping from a high-dimensional noise space $Z=R_{dz}$ onto the input space X on which a target distribution f(X) is defined. In this situation, the $Z \rightarrow X$ as a mapping function may consist of weights applied on a user's interaction with a user device whether through a device accessory, such as a mouse or keyboard, or a device touchscreen upon receiving a particular message content in a given contextual situation. The pseudo algorithmic function may be represented as:

$$Z=f(w1*context+w2*content+w3*User\_activity+w4*user\_reactions)$$

where X=[context, content, activity, reactions] added in categorical feature format.

The generator's task may consist in fitting the underlying distribution of observed data f(X) as closely as possible. The discriminator network $D:X \rightarrow R \cap [0, 1]$ may score each input as the probability of coming from the real data distribution f(X) or from the generator G. Both networks may be gradually improved through alternating or simultaneous gradient descent updates.

A Markhov decision process (MDP) may be utilized in the pseudo algorithm and described as a tuple $(S,A,r,P,\rho)$, where S is the set of states that is able to precisely describe the current situation, A is the set of actions, r(s,a) is the reward function, P(s'|s, a) is the transition probability function, and $\rho(s)$ is the initial state distribution.

A contextual situation C is modulated to C' under content message $C_M$ for a particular generated use case as an alteration of a given known use case Uc and that is varied over time $\Delta_T$ to predict the user's reactions/responses UR in said situations C'. The convergence may be built over time to generate the risk score, which may be an output of the given network highlighting a measure between [0,1] where in lim O_P→i.e. <0.5 indicates a delay in the notification and >0.5 would classify no delay based on the situation. Different contextual situations generated C' may be clustered using a K-nearest neighbors algorithm (KNN) via the similarities in said situations and time frames for a specific user.

Then, at 204, the mute management program 110A, 110B identifies a user level of activity. While a user performs tasks, the user may experience different levels of focus. Using known image recognition technologies and user device sensors, the mute management program 110A, 110B may be capable of identifying whether a user is focused on a specific activity, the type of activity in which the user is engaged, and the user's focus level on the activity. For example, the mute management program 110A, 110B identify that the user is highly focused on an accounting spreadsheet indicating the user is working diligently. Similarly, the mute management program 110A, 110B may identify that the user is browsing a social media account and jumping between different tabs, which indicates a low level of focus an any one particular item.

Next, at 206, the mute management program 110A, 110B receives an incoming communication. Throughout normal operation, a user device, such as client computing device 102, may receive communications from various applications, such as software program 108. The incoming communication may take any number of forms, such as an email, an SMS, a phone call, an application alert, etc.

Then, at 208, the mute management program 110A, 110B calculates a priority value for the incoming communication. When receiving an incoming communication, the mute management program 110A, 110B may analyze the contextual priority of the received communication content with respect to the user's current engagement, predicted availability, etc., and, accordingly, determine if the communication content notification should be muted or unmuted. The mute management program 110A, 110B may calculate the priority value for each communication based on communication content, communication sender, communication sender relationship to the user, sender's communication history with the user, time of day, day of week, user current location, sender current location, and application from which the communication originates using GPS technologies and known natural language processing techniques.

Next, at 210, the mute management program 110A, 110B determines whether an alert notification should be sent to the user. The mute management program 110A, 110B may utilize the calculated priority value of the incoming transmission to determine if a notification to the user should be muted or unmuted. Based on the comparative priority score, the mute management program 110A, 110B may determine if the notification should be delivered immediately or if notification should be paused or muted if the calculated priority score satisfies a preconfigured threshold value for alert notification. If the mute management program 110A, 110B determines the calculated priority score satisfies the preconfigured threshold value (step 208, "Yes" branch), then the mute management process 200 may proceed to step 210 to transmit a notification to the user. If the mute management program 110A, 110B determines the calculated priority score does not satisfy the preconfigured threshold value (step 208, "No" branch), then the mute management process 200 may proceed to step 212 to mute the notification. In at least one embodiment, the mute management program 110A, 110B may delay transmission of the notification to the user until a predicted time at which the user may be available.

In at least one other embodiment, the mute management program 110A, 110B may weight the calculated priority value against the user level of activity to determine whether the alert notification should be sent. The weighting may be based on a correlated sliding scale of importance and user activity level. For example, if the user activity level is very low, such as when the user is browsing the internet, then messages that satisfy a low threshold for priority value (e.g., communications with a low priority value or higher) may be transmitted to the user device display screen, or other notification mechanism(s), to alert the user. Conversely, if the user activity level is high, such as a user engaging in work-related activities, only messages that satisfy a high threshold for priority value (e.g., communications with a high priority) may be transmitted to the user.

Then, at 212, the mute management program 110A, 100B transmits a notification to the user. If the mute management program 110A, 110B determines the calculated priority score satisfies the preconfigured threshold value, the mute management program 110A, 100B may transmit the notification to a display screen of a user device, such as client computing device 102, and/or enable other notification mechanisms, such as a user device vibration function.

Next, at 214, the mute management program 110A, 110B mutes the notification to the user. If the mute management program 110A, 110B determines the calculated priority score does not satisfy the preconfigured threshold value, the mute management program 110A, 100B may mute the notification.

In at least one embodiment, the muting may include pausing notification of the communication to the user until the mute management program 110A, 110B determines the user activity level is below a threshold based on an ongoing monitoring of the user activity level. For example, if the mute management program 110A, 110B determined the user had a high activity level due the user engaging in work-related activities, the mute management program 110A, 110B may mute the notification until the mute management program 110A, 110B determines the user stops the high level activity based on user interactions with a user device, such as opening a web browser and navigating to a social media page, or one or more sensors associated with a user device, such as a GPS-enabled fitness device detecting the user rising from a chair.

In at least one other embodiment, and as previously described, the mute management program 110A, 110B may mute notification until a predicted time based on various factors. For example, if a communication is received at 3:45 P.M. and the mute management program 110A, 110B determined to mute notification of the communication based on the user activity level indicating the user is in a business meeting and the communication priority level is low, the mute management program 110A, 110B may determine to unmute the notification at 4:00 P.M. due to a scheduled calendar event on the user's calendar ending.

It may be appreciated that FIG. 2 provides only an illustration of one implementation and does not imply any limitations with regard to how different embodiments may be implemented. Many modifications to the depicted environments may be made based on design and implementation requirements. In at least one embodiment, the mute management program 110A, 110B may be manually enabled by a user through a graphical user interface setting selection. Currently, many real-time communication systems provide time bound muting options, such as a period of minutes, hours, or days. The mute management program 110A, 110B add a setting to the graphical user interface that may be labeled "AI-enabled mute management". User selection of this setting may commence the mute management process 200.

Figure 3:
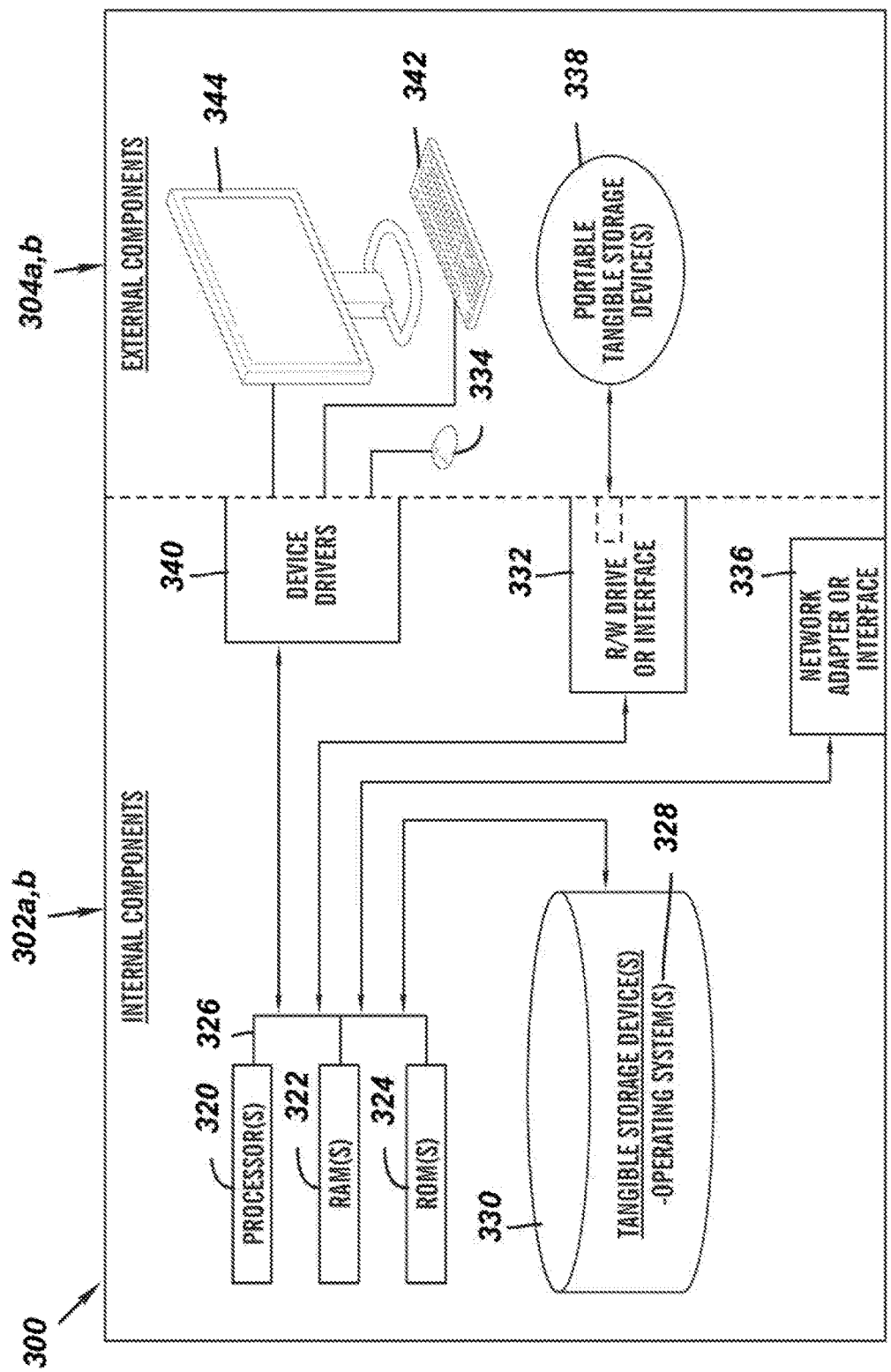
FIG. 3 is a block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302 a,b and external components 304 a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the mute management program 110A in the client computing device 102 and the mute management program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the mute management program 110A, 110B, can be stored on one or more of the respective portable computer-readable tangible storage devices 338, read via the respective R/W drive or interface 332, and loaded into the respective hard drive 330.

Each set of internal components 302 a,b also includes network adapters or interfaces 336 such as a TCP/IP adapter cards, wireless Wi-Fi interface cards, or 3G or 4G wireless interface cards or other wired or wireless communication links. The software program 108 and the mute management program 110A in the client computing device 102 and the mute management program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the software program 108 and the mute management program 110A in the client computing device 102 and the mute management program 110B in the server 112 are loaded into the respective hard drive 330. The network may comprise copper wires, optical fibers, wireless transmission, routers, firewalls, switches, gateway computers and/or edge servers.

Each of the sets of external components 304 a,b can include a computer display monitor 344, a keyboard 342, and a computer mouse 334. External components 304 a,b can also include touch screens, virtual keyboards, touch pads, pointing devices, and other human interface devices. Each of the sets of internal components 302 a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
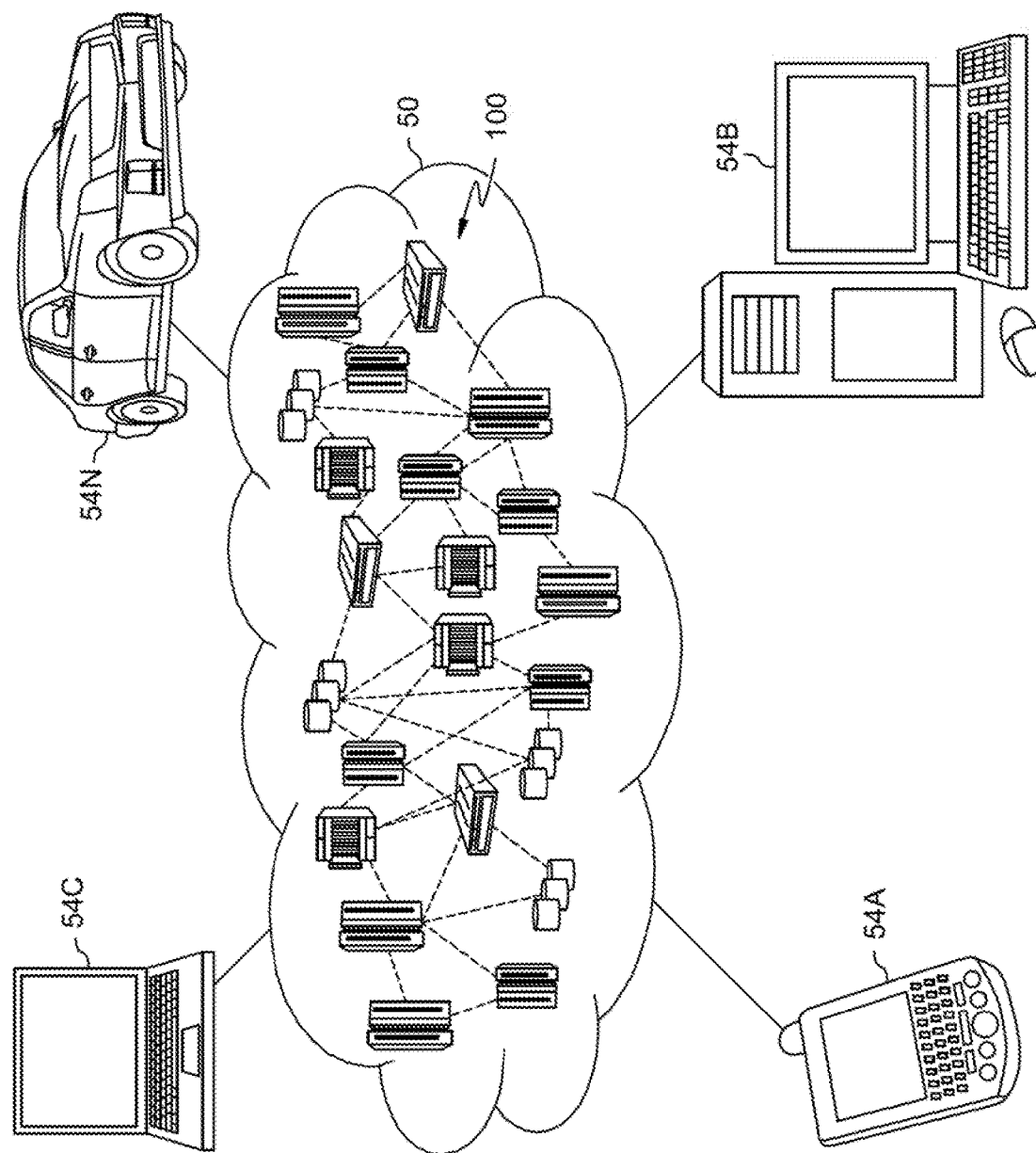
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
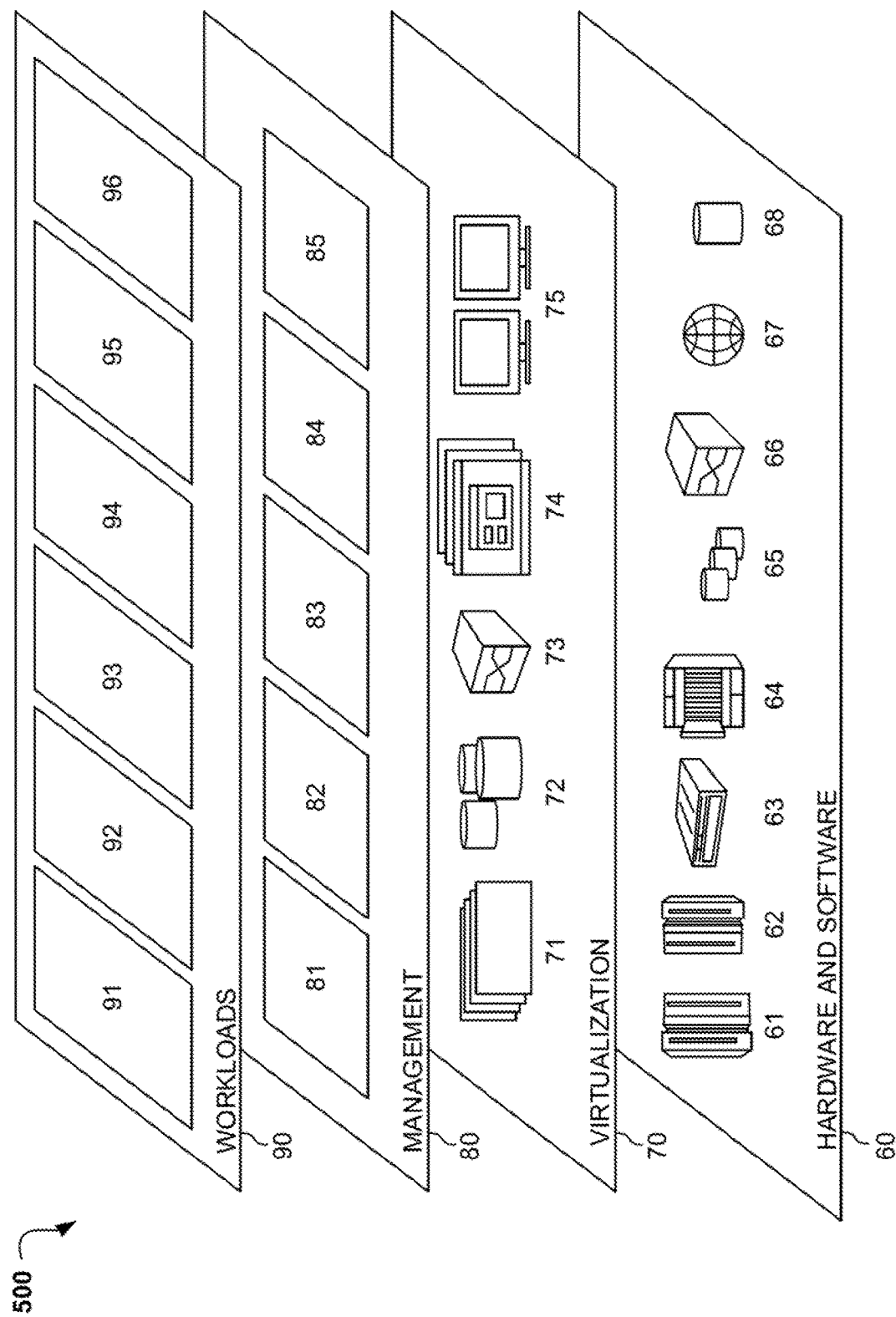
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and AI-enabled mute management 96. AI-enabled mute management 96 may relate analyzing user behaviors for historical interactions when an application notification displays on a user device and a user's currently activity level and, cognitively, determining whether an instant notification should be muted or unmuted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method, the method comprising:
    generating, by a processor, a generative adversarial network (GAN), Q-learning-enabled, personalized communication corpus from real time data and trained with historical user interaction data, wherein the historical user interaction data comprises a user interaction pattern with real-time communication content, a user level of engagement with other activities, a user distraction pattern, and a user pattern of reply messaging, and wherein the training further comprises:
        identifying one or more user distraction points using the historical user interaction data;
        identifying a current activity level for a user based on user device sensor data, wherein the user device sensor data comprises accelerometer data, gyroscopic data, and biometric data;
        receiving a new communication from an application;
        calculating a priority value for the received new communication;
        determining whether to mute a notification transmission of the received new communication to the user based on the calculated priority value and the generated GAN, Q-learning-enabled, personalized communication corpus; and
        in response to determining to mute the notification transmission, muting the notification.

2. The method of claim 1, further comprising:
    calculating a prediction of an available time for the user at which a minimal distraction to the user will be observed.

3. The method of claim 2, further comprising:
    transmitting, at the available time, the notification to the user based on the prediction.

4. The method of claim 1, wherein historical user interaction data to identify patterns using known machine learning techniques, identification of user distraction points while performing tasks, and prioritizing user tasks and activities are gathered and used to generate the GAN, Q-learning-enabled, personalized communication corpus.

5. The method of claim 4, wherein the historical user interaction data is selected from a group consisting of a user's selectively reading of communication messages, user time spent on individual messages, user reactions to messages, messages skipped or time spent on messages that falls below a threshold, and reactions to a communication by other users within a group communication.

6. The method of claim 1, wherein the priority value is calculated based on various factors selected from a group consisting of a time of day, a day of week, a user current location, and a sender current location.

7. A computer system, the computer system comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    generating, by a processor, a generative adversarial network (GAN), Q-learning-enabled, personalized communication corpus from real time data and trained with historical user interaction data, wherein the historical user interaction data comprises a user interaction pattern with real-time communication content, a user level of engagement with other activities, a user distraction pattern, and a user pattern of reply messaging, and wherein the training further comprises:
        identifying one or more user distraction points using the historical user interaction data;
        identifying a current activity level for a user based on user device sensor data, wherein the user device sensor data comprises accelerometer data, gyroscopic data, and biometric data;
        receiving a new communication from an application;
        calculating a priority value for the received new communication;
        determining whether to mute a notification transmission of the received new communication to the user based on the calculated priority value and the generated GAN, Q-learning-enabled, personalized communication corpus; and
        in response to determining to mute the notification transmission, muting the notification.

8. The computer system of claim 7, further comprising:
    calculating a prediction of an available time for the user at which a minimal distraction to the user will be observed.

9. The computer system of claim 8, further comprising:
    transmitting, at the available time, the notification to the user based on the prediction.

10. The computer system of claim 7, wherein historical user interaction data to identify patterns using known machine learning techniques, identification of user distraction points while performing tasks, and prioritizing user tasks and activities are gathered and used to generate the GAN, Q-learning-enabled, personalized communication corpus.

11. The computer system of claim 10, wherein the historical user interaction data is selected from a group consisting of a user's selectively reading of communication messages, user time spent on individual messages, user reactions to messages, messages skipped or time spent on messages that falls below a threshold, and reactions to a communication by other users within a group communication.

12. The computer system of claim 7, wherein the priority value is calculated based on various factors selected from a group consisting of a time of day, a day of week, a user current location, and a sender current location.

13. A computer program product, the computer program product comprising:
    one or more computer-readable tangible storage medium and program instructions stored on at least one of the one or more tangible storage medium, the program instructions executable by a processor capable of performing a method, the method comprising:
    generating, by a processor, a generative adversarial network (GAN), Q-learning-enabled, personalized communication corpus from real time data and trained with historical user interaction data, wherein the historical user interaction data comprises a user interaction pattern with real-time communication content, a user level of engagement with other activities, a user distraction pattern, and a user pattern of reply messaging, and wherein the training further comprises:

identifying one or more user distraction points using the historical user interaction data;

identifying a current activity level for a user based on user device sensor data, wherein the user device sensor data comprises accelerometer data, gyroscopic data, and biometric data;

receiving a new communication from an application;

calculating a priority value for the received new communication;

determining whether to mute a notification transmission of the received new communication to the user based on the calculated priority value and the generated GAN, Q-learning-enabled, personalized communication corpus; and in response to determining to mute the notification transmission, muting the notification.

14. The computer program product of claim 13, further comprising:

calculating a prediction of an available time for the user at which a minimal distraction to the user will be observed.

15. The computer program product of claim 14, further comprising:

transmitting, at the available time, the notification to the user based on the prediction.

16. The computer program product of claim 13, wherein historical user interaction data to identify patterns using known machine learning techniques, identification of user distraction points while performing tasks, and prioritizing user tasks and activities are gathered and used to generate the GAN, Q-learning-enabled, personalized communication corpus.

17. The computer program product of claim 16, wherein the historical user interaction data is selected from a group consisting of a user's selectively reading of communication messages, user time spent on individual messages, user reactions to messages, messages skipped or time spent on messages that falls below a threshold, and reactions to a communication by other users within a group communication.

\* \* \* \* \*